US005764310A

United States Patent [19]
Yamagishi

[11] Patent Number: 5,764,310
[45] Date of Patent: Jun. 9, 1998

[54] PROJECTION TYPE IMAGE DISPLAY APPARATUS

[75] Inventor: Shigekazu Yamagishi, Osaka, Japan

[73] Assignee: Matsushita Electric Industrial Co., Ltd., Osaka, Japan

[21] Appl. No.: 662,349

[22] Filed: Jun. 12, 1996

[30] Foreign Application Priority Data

Jun. 13, 1995 [JP] Japan ................. 7-146011

[51] Int. Cl.$^6$ ............... H04N 5/64; G02F 1/1335
[52] U.S. Cl. ............... 348/744; 348/761; 349/5; 349/95
[58] Field of Search ............... 348/744, 750, 348/751, 756, 757, 761, 766, 759, 760; 349/5, 7, 8, 56, 57, 61, 62, 95; H04N 9/31, 5/74, 5/64

[56] References Cited

U.S. PATENT DOCUMENTS

| | | | |
|---|---|---|---|
| 5,052,783 | 10/1991 | Hamada | 349/5 |
| 5,161,042 | 11/1992 | Hamada | 349/95 |
| 5,231,431 | 7/1993 | Yano et al. | |
| 5,305,146 | 4/1994 | Nakagaki et al. | |
| 5,561,538 | 10/1996 | Kato et al. | 349/5 |
| 5,581,379 | 12/1996 | Aoyama et al. | 349/5 |
| 5,621,550 | 4/1997 | Oku | |
| 5,633,737 | 5/1997 | Tanaka et al. | 349/95 |
| 5,666,176 | 9/1997 | Kurematsu | 349/95 |

FOREIGN PATENT DOCUMENTS

| | | |
|---|---|---|
| 0 337 555 | 10/1989 | European Pat. Off. |
| 0 465 171 | 1/1992 | European Pat. Off. |
| 0 469575 | 2/1992 | European Pat. Off. |
| 0 602 732 | 6/1994 | European Pat. Off. |
| 08054623 | 2/1996 | Japan |
| 93/11452 | 6/1993 | WIPO |
| 95/12286 | 5/1995 | WIPO |

*Primary Examiner*—Michael H. Lee
*Attorney, Agent, or Firm*—Ratner & Prestia

[57] ABSTRACT

A projection type image display apparatus of a single plate system using a single liquid crystal panel featuring compactness, light weight and high brightness is provided. The apparatus comprises a liquid crystal unit, a first filter located on the light incident side of a first picture element to be driven according to a first color signal and provided with the ability to pass light of a first wavelength only, a second filter located on the light incident side of a second picture element to be driven according to a second color signal and provided with the ability to pass light of a second wavelength only, a microlens array with a plurality of microlenses, each of which measures three times the dimension of each picture element, a reflective layer characterized by reflecting the second wavelength light and third wavelength light at places other than the place where the light from the microlens passes through, an illumination system, and a light projection system.

18 Claims, 5 Drawing Sheets

PROJECTION TYPE IMAGE DISPLAY APPARATUS

BACKGROUND OF THE INVENTION

The present invention relates to a projection type image display apparatus employing a light valve to control the light from a light source and particularly relates to an image display apparatus, whereby color images are displayed through controlling projected images of three colors of blue, green and red, all performed within a single image display apparatus.

Replacing the conventional projection type image display apparatus that employs a cathode ray tube (CRT), a projection type image display apparatus using a liquid crystal panel has been widely accepted by the market with respect to its compactness, light weight, easy installation and attractive price. This projection type image display apparatus using a liquid crystal panel can be generally divided into two kinds.

One projection type image display apparatus is a single plate system which uses one liquid crystal panel with a color filter corresponding to each respective picture element to perform light wavelength selections for displaying color images.

Figure 8:
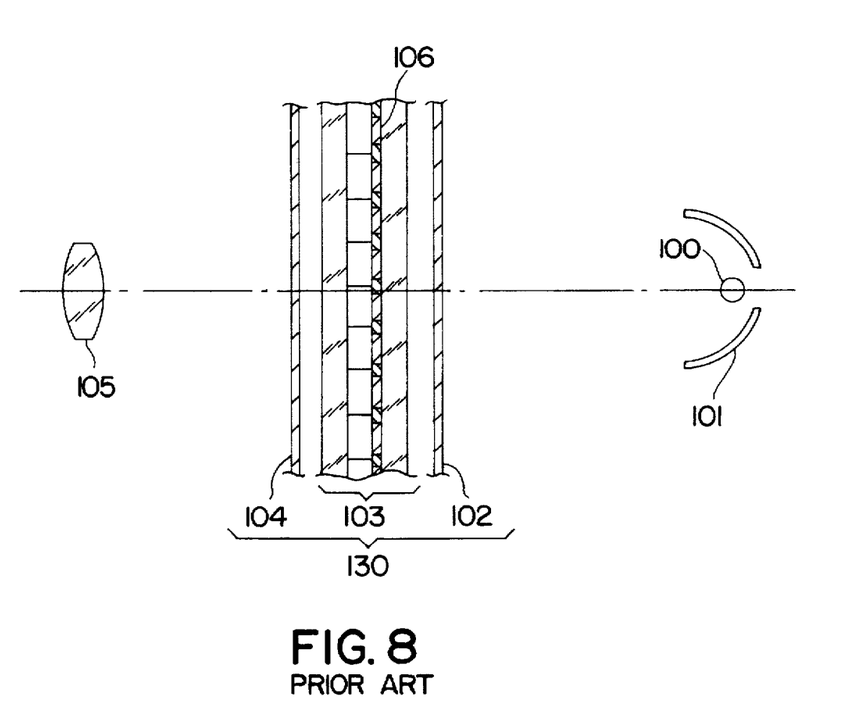
FIG. 8 is a schematic illustration of a prior art image display apparatus using a single plate system.

The other image display apparatus type is a three plate system wherein the light wavelength selections according to blue, green and red are applied to the light from a light source in advance by means of dichroic mirrors and the light thus screened is incident on and passes through each of the liquid crystal panels as assigned according to the three colors to display color images. FIG. 8 illustrates a schematic structure of a prior art projection type image display apparatus using a single plate system employing one liquid crystal unit. The white light from a light source 100 is radiated towards the opening side of a reflective mirror 101. The radiated light is incident on a liquid crystal unit 130 which is comprised of a light incident side polarizer 102, a liquid crystal panel 103 and a light radiant side polarizer 104.

Out of the light incident on the light incident side polarizer 102, a light component with the same polarizing direction as the light transmissive axis of the polarizer passes through the polarizer, and a light component with the same polarizing direction as the light absorption axis of the polarizer is absorbed by the polarizer. The light incident on the liquid crystal panel 103 after having passed through the light incident side polarizer 102 is incident on each respective color filter 106 disposed on each picture element. More specifically, a picture element to be driven by a signal tuned to the red color wavelength is covered with a color filter that only allows the red light of the incident white light to pass through and absorbs all the wavelengths of other colors. Also, a picture element to be driven by a signal tuned to the blue color wavelength is covered with a color filter that only allows the blue light out of the incident white light to pass through and absorbs all the wavelengths of other colors.

When a picture element signal is in an ON state, the light having passed through the color filter without changing its polarizing direction passes through the liquid crystal panel 103 and is incident on the light radiant side polarizer 104. However, the light transmissive axis of the light radiant side polarizer 104 is rotated 90 degrees relative to the light transmissive axis of the light incident side polarizer 102. As a result, the light that passed through the color filter is absorbed here and a "black" display will be present on the projected images.

When a picture element signal is in an OFF state, the light passes through the color filter 103 after its polarizing direction has been rotated by 90 degrees and is incident on the light radiant side polarizer 104. Since the light transmissive axis of the light radiant side polarizer 104 is in agreement with the polarizing direction of the incident light, the images composed of the picture elements of the liquid crystal panel 103 that are in the OFF state pass through the light radiant side polarizer 104. The images having passed through the light radiant side polarizer 104 are enlarged and projected by a projection lens 105.

Figure 9:
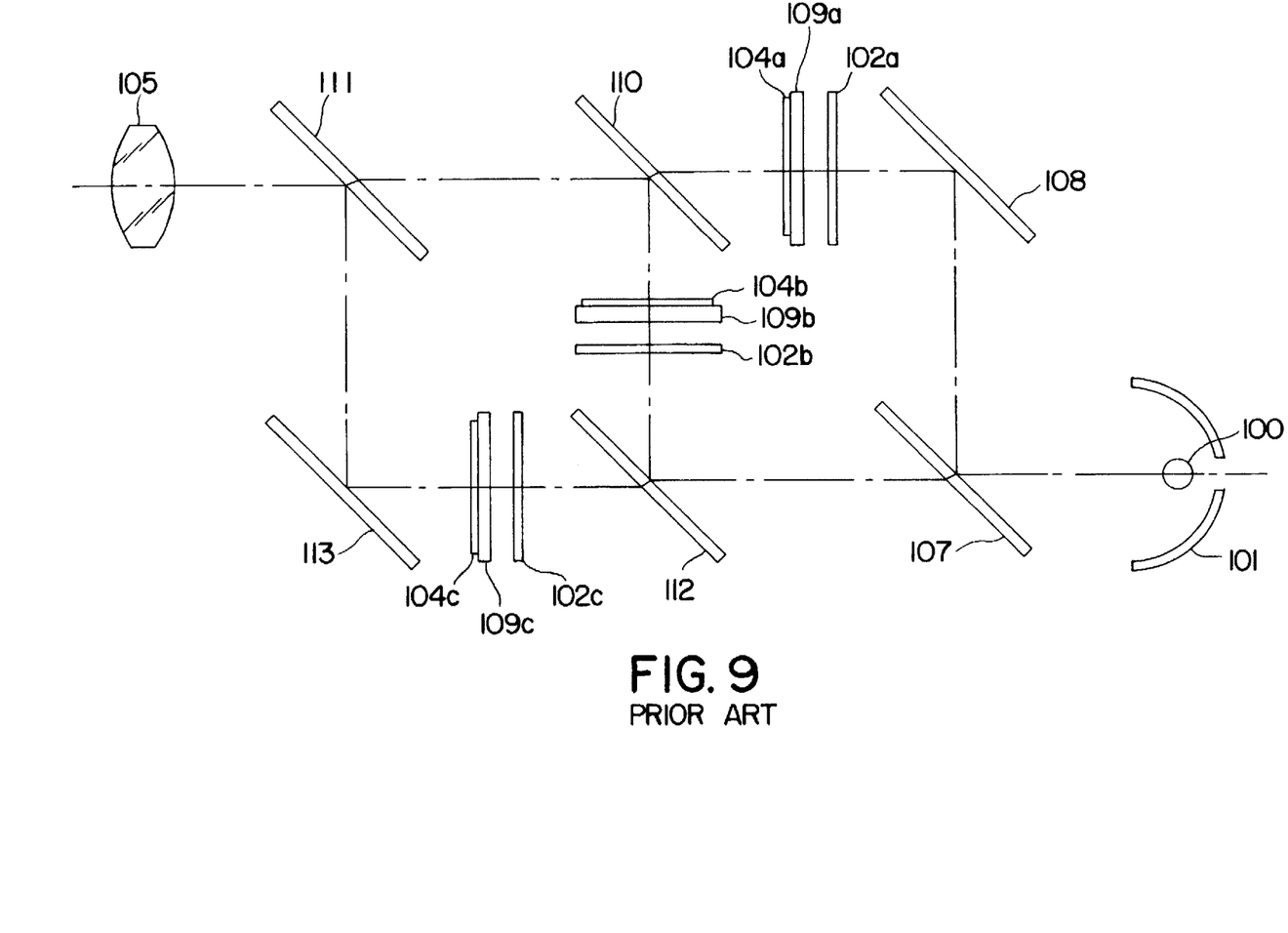
FIG. 9 is a schematic illustration of a prior art image display apparatus using a three plate system.

FIG. 9 illustrates a schematic structure of a prior art projection type image display apparatus using a three plate system employing three liquid crystal units. The white light from a light source 100 is radiated towards the opening side of a reflective mirror 101. The radiated light is incident on a first dichroic mirror 107, where a first color only is reflected and the reflected light is incident on a first plane mirror 108. The light reflected by the plane mirror 108 is then incident on a first light incident side polarizer 102a. Out of the light incident on the first light incident side polarizer 102a, a light component with the same polarizing direction as the light transmissive axis of the polarizer 102a passes through the polarizer 102a, and a light component with the same polarizing direction as the light absorption axis of the polarizer 102a is absorbed by the polarizer 102a. The light incident on a first liquid crystal panel 105a after having passed through the first light incident side polarizer 102a is incident on each respective picture element that can be driven individually by an external signal.

With this prior art projection type image display apparatus using a three plate system, color filters employed in the projection type image display apparatus using a single plate system as described above are not used.

When a picture element signal is in an ON state, the light having passed through each picture element without changing its polarizing direction is incident on a first light radiant side polarizer 104a after passing through the first liquid crystal panel 109a. However, the light transmissive axis of the first light radiant side polarizer 104a is rotated 90 degrees relative to the light transmissive axis of the first light incident side polarizer 102a, resulting in an absorption of the light that passed through the picture elements and a "black" display for the first color presented on the projected images.

When a picture element signal is in an OFF state, the light passing through picture elements after its polarizing direction was rotated 90 degrees is incident on the first light radiant side polarizer 104a after having passed through the first liquid crystal panel 109a. Since the light transmissive axis of the first light radiant side polarizer 104a is the same as the polarizing direction of the incident light, the images composed of the picture elements of the first liquid crystal panel 105a that are in the OFF state pass through the first light radiant side polarizer 104a. The images having passed through the first light radiant side polarizer 104a pass through a second dichroic mirror 110 and a third dichroic mirror 111, and then are enlarged and projected by the projection lens 105.

A second color and a third color that have passed through the first dichroic mirror 107 are incident on a fourth dichroic mirror 112, and only the second color is reflected. This reflected second color is incident on a second light incident side polarizer 102b. In the same way as observed with the first color, when the picture element signal of a second liquid crystal panel 109b is in an OFF state, the light incident on the second light incident side polarizer 102b passes through a second light radiant side polarizer 104b. The images of the second color having passed through the second light radiant side polarizer 104b are reflected by the second dichroic mirror 110, and combined with the first color images as mentioned above. Then the composite images are enlarged and projected by the projection lens 105 after having passed through the third dichroic mirror 111.

The third color light is incident on a third light incident side polarizer 102c after having passed through the fourth dichroic mirror 112. In the same way as observed with the first color and the second color, when the picture element signal of a third liquid crystal panel 109c is in an OFF state, the light incident on the third light incident side polarizer 102c passes through a third light radiant side polarizer 104c. The third color images having passed through the third light radiant side polarizer 104c are reflected by a second plane mirror 113 and the third dichroic mirror 111, and combined with the first color images and the second color images as described above. Then the composite images are enlarged and projected by the projection lens 105.

Thus, a color display is achieved by optically combining three different color images by the projection type image display apparatus using a three plate system.

The prior art projection type image display apparatus using a single plate system as described above is low in cost and compact in size. Therefore, this single plate system apparatus has become predominant in the market as far as the number of units is concerned. However, when a wavelength selection is made with the projection type image display apparatus of the single plate system, the light utilization factor is not good enough and it ranges from one third to one fourth of the light utilization factor of the projection type image display apparatus of the three plate system. Further, color filters absorb large amounts of heat, which adversely affects the performance of liquid crystal panels with a resulting limitation imposed on the brightness of liquid crystal panels.

In addition, when the same liquid crystal panel as used with a projection type image display apparatus of a three plate system is employed in a projection type image display apparatus of a single plate system, the resolution of the projection type image display apparatus of the single plate system becomes one third that of the projection type image display apparatus of the three plate system. Therefore, a projection type image display apparatus of a single plate system is not suitable for industrial use requiring high performance.

The projection type image display apparatus of the three plate system is characterized by an excellent light utilization factor due to use of dichroic mirrors for color decomposition and also achieves excellent resolution as described above. Therefore, the projection type image display apparatus of a three plate system is used in the area where good picture quality is required. However, the projection type image display apparatus of the three plate system has inherent drawbacks such as complicated and rather large structures, high costs and the like. Because of the above reasons, it is not likely for the projection type image display apparatus of a three plate system to be prevailing in the home use.

SUMMARY OF THE INVENTION

The goal of the present invention is to provide a projection type image display apparatus which is as compact as a projection type image display apparatus of a single plate system and also has an excellent light utilization factor and good picture quality that are almost equal to those of a projection type image display apparatus of a three plate system.

A projection type image display apparatus of the present invention comprises:

an illumination means;

a microlens array located in the light radiant direction of the illumination means;

a transmission type image display means located on the light radiant side of the microlens array;

a first filter, a second filter and a light reflecting means arranged between the transmission type image display means and microlens array, and in parallel to the transmission type image display means; and a light projection means located on the light radiant side of the transmission type image display means.

The transmission type image display means has a plurality of picture elements comprising a first picture element to be driven by a first color signal corresponding to light of a first wavelength, a second picture element to be driven by a second color signal corresponding to light of a second wavelength, and a third picture element to be driven by a third color signal corresponding to light of a third wavelength.

The first filter is located on the light incident side of and in parallel to the first picture element of the transmission type image display means that is driven according to the first color signal, of a width almost equal to that of the picture element and characterized by passing the first wavelength light only and reflecting light of other wavelengths.

The second filter is located on the light incident side of and in parallel to the second picture element of the transmission type image display means that is driven according to the second color signal, of a width almost equal to that of the picture element and characterized by reflecting the third wavelength light only.

The microlens array is located on the light incident side of both the first filter and the second filter, and comprised of microlenses, each measuring about three times the size of each respective picture element of the transmission type image display means.

The light reflecting means is arranged between both the first filter and the second filter and the microlens array, and characterized by reflecting at least the second wavelength light and third wavelength light in areas of the light reflecting means other than the area where the light from the microlens passes through.

The illumination means is comprised of a light source to radiate the light containing the first wavelength light, second wavelength light and third wavelength light, and a means to control light from the light source. The first wavelength, second wavelength and third wavelength are the wavelengths corresponding to blue, green and red in color, respectively.

The light projection means enlarges and projects the images controlled by the transmission type image display means.

In the foregoing structures, the first wavelength light from the illumination means passes through the microlens, the first filter and the first picture element, and is incident on the light projection means. The second wavelength light from the illumination means passes through the microlens, is reflected by the first filter and light reflecting means, passes through the second picture element and is incident on the light projection means. The third wavelength light from the illumination means passes through the microlens, is reflected by the first filter, light reflecting means, second filter and light reflecting means, passes through the third picture element and is incident on the light projection means.

Thus, enlarged and projected images composed of the first wavelength light, second wavelength light and third wavelength light are reproduced on a screen.

Furthermore, it is desirable to set up the foregoing structures so that the light from the illumination means is incident on the microlens obliquely against the light axis of the microlens.

Another projection type image display apparatus of the present invention comprises:

am illumination means;

a microlens array arranged in the light radiant direction of the illumination means;

a transmission type image display means located on the light radiant side of the microlens array;

a first filter, a second filter and a light reflecting means arranged between the transmission type image display means and microlens array, and obliquely against the transmission type image display means; and a light projection means located on the light radiant side of the transmission type image display means.

The transmission type image display means has a plurality of picture elements comprising a first picture element to be driven by a first color signal corresponding to light of a first wavelength, a second picture element to be driven by a second color signal corresponding to light of a second wavelength and a third picture element to be driven by a third color signal corresponding to light of a third wave length.

The microlens array is comprised of microlenses, each measuring about three times the size of each picture element of the transmission type image display means.

The first filter is arranged obliquely on the light incident side of the first picture element of the transmission type image display means to be driven according to the first color signal, of a width almost equal to that of the first picture element and characterized by passing the first wavelength light only and reflecting light of other wavelengths.

The second filter is arranged on the light incident side of the second picture element of the transmission type image display means to be driven according to the second color signal in parallel to the first filter, of a width almost equal to that of the second picture element and characterized by reflecting the third wavelength light only.

The light reflecting means is arranged between both the first filter and second filter and the microlens array in parallel to the first filter, and characterized by reflecting at least the second wavelength light and third wavelength light in the areas of the light reflecting means other than the area where the light from the microlens passes through.

The illumination means is comprised of a light source to radiate the light containing the first wavelength light, second wavelength light and third wavelength light, and a means to control the light from the light source.

The light projection means enlarges and projects the images controlled by the transmission type image display means.

In the structures described above, the first wavelength light from the illumination means passes through the microlens, first filter and first picture element, and is incident on the light projection means. The second wavelength light from the illumination means passes through the microlens, is reflected by the first filter, light reflecting means and second filter, passes through the second picture element and is incident on the light projection means. The third wavelength light from the illumination means passes through the microlens, is reflected by the first filter, light reflecting means, second filter and light reflecting means, passes through the third picture element and is incident on the light projection means. Thus, enlarged and projected images formed of the first wavelength light, second wavelength light and third wavelength light are reproduced on a screen.

Further, it is desirable to set up the foregoing structures so that the light from the illumination means is incident on the microlens vertically to the light axis of the microlens.

Still another projection type image display apparatus of the present invention comprises:

an illumination means, a microlens array arranged obliquely to the light radiating direction of the illumination means;

a reflection type image display means located on the light radiant side of the microlens array;

a first filter, second filter, third filter and fourth filter arranged between the reflection type image display means and microlens array in parallel to the reflection type image display means;

a light reflecting means located on the back side of the reflection type image display means; and a light projection means located in front of the microlens array.

The reflection type image display means has a plurality of picture elements comprising a first picture element to be driven by a first color signal corresponding to light of a first wavelength light, a second picture element to be driven by a second color signal corresponding to light of a second wavelength, and a third picture element to be driven by a third color signal corresponding to light of a third wavelength.

The first filter is arranged on the light incident side of the first picture element of the reflection type image display means to be driven according to the first color signal in parallel to the first picture element, of a width almost equal to that of the first picture element and characterized by passing the first wavelength light only and reflecting light of other wavelengths.

The second filter is arranged on the light incident side of the second picture element of the reflection type image display means to be driven according to the second color signal in parallel to the second picture element, of a width almost equal to that of the second picture element and characterized by reflecting the third wavelength light only.

The third filter is located at a position intersecting both light paths of the light reflected by the light reflecting means and the light reflected by the first filter, and characterized by reflecting the second wavelength light and third wavelength light and passing the first wavelength light.

The fourth filter is located at a position intersecting the light path of the light reflected by the light reflecting means that is disposed on the back side of the second picture element and the light path of the light reflected by the second filter, and characterized by reflecting the third wavelength light and passing the second wavelength light.

The light reflecting means is capable of reflecting light of all wavelengths.

The microlens array is comprised of microlenses, each measuring about three times the size of each respective picture element of the reflection type image display means.

The illumination means is comprised of a light source to radiate the light containing the first wavelength light, second wavelength light and third wavelength light, and a means to control light from the light source.

The light projection means enlarges and projects the images controlled by the reflection type image display means.

In the foregoing structures, the first wavelength light from the illumination means passes through the microlens, first filter and first picture element, is reflected by the light reflecting means, passes through the third filter and is incident on the light projection means. The second wavelength light from the illumination means passes through the microlens is reflected by the first filter and third filter, passes through the second filter and second picture element, is reflected by the light reflecting means, passes through the fourth filter and is incident on the light projection means. The third wavelength light from the illumination means passes through the microlens, is reflected by the first filter, third filter, second filter and fourth filter, passes through the third picture element, is reflected by the light reflecting means and is incident on the light projection means. Thus, enlarged and projected images composed of the first wavelength light, second wavelength light and third wavelength light are reproduced on a screen.

Still another projection type image display apparatus of the present invention comprises:

an illumination means radiating light of a first wavelength, light of a second wavelength and light of a third wavelength;

a microlens array arranged in the light radiant direction of the illumination means:

a transmission type image display means located on the light radiant side of the microlens array;

a first filter, a second filter, a third filter and a fourth filter arranged between the transmission type image display means and the microlens array in parallel to the transmission type image display means;

a light reflecting means placed on the surface of the microlens array at the light radiant side of the microlens array; and a light projection means located on the light radiant side of the transmission type image display means.

The transmission type image display means has a plurality of picture elements comprising a first picture element and a fourth picture element both to be driven by a first color signal corresponding to the first wavelength light, a second picture element and a fifth picture element both to be driven by a second color signal corresponding to the second wavelength light, and a third picture element and a sixth picture element both to be driven by a third color signal corresponding to the third wavelength light.

The microlens array is comprised of a plurality of microlenses, each measuring about six times the size of each respective picture element of the transmission type image display means.

The first filter is located on the light incident side of the fourth picture element in parallel to the fourth picture element, of a width almost equal to that of the fourth picture element and characterized by passing the first wavelength light only and reflecting light of other wavelengths.

The second filter is located on the light incident side of the fifth picture element in parallel to the first filter, of a width almost equal to that of the fifth picture element and characterized by reflecting the second wavelength light only.

The third filter is located on the light incident side of the third picture element in parallel to the first filter, of a width almost equal to that of the fifth picture element and characterized by reflecting the third wavelength light only.

The fourth filter is located on the light incident side of the second picture element in parallel to the first filter, of a width almost equal to that of the second picture element and characterized by passing the second wavelength light only and reflecting light of other wavelengths.

The light reflecting means is characterized by reflecting the second wavelength light and third wavelength light in the other areas of the light reflecting means than the area where the light from the microlens passes through.

The illumination means comprises a first illumination means, which has a first light path of the light incident on the microlens making an incident angle of (−A) with the light axis of the microlens, and a second illumination means, which has a second light path of the light incident on the microlens making an incident angle of (+A) with the light axis of the microlens.

The light projection means enlarges and projects the images controlled by the transmission type image display means.

In the foregoing structures, the first wavelength light from the first illumination means passes through the microlens, the first filter and fourth picture element and is incident on the light projection means.

The second wavelength light from the first illumination means passes through the microlens, is reflected by the first filter and light reflecting means, passes through the second filter and fifth picture element and is incident on the light projection means. The third wavelength light from the first illumination means passes through the microlens, is reflected by the first filter, light reflecting means, second filter and light reflecting means, passes through the sixth picture element and is incident on the light projection means. The first wavelength light from the second illumination means passes through the microlens, is reflected by the third filter, light reflecting means, fourth filter and light reflecting means, passes through the first picture element and is incident on the light projection means. The second wavelength light from the second illumination means passes through the microlens, is reflected by the third filter and light reflecting means, passes through the fourth filter and second picture element, and is incident on the light projection means. The third wavelength light from the second illumination means passes the microlens array, third filter and third picture element, and is incident on the light projection means.

Thus, enlarged and projected color images formed by combining the first wavelength light, second wavelength light and third wavelength light are reproduced on a screen.

With the foregoing structures, it becomes possible to perform color decomposition by utilizing a variety of filters and light reflecting means without using the conventional absorption type color filters. As a result, while maintaining the feature of compactness of the image display apparatus of a single plate system, a high luminance color image display apparatus with more than about three times the luminance of the prior art image display apparatus of a single plate system has become available.

Furthermore, since the light absorption taking place within an image display apparatus is greatly reduced, the heat resistance of the image display apparatus is enhanced. Therefore, it becomes possible to increase the output of the light source with a resulting realization of a color image display apparatus of much higher luminance.

| Key to Symbol | |
|---|---|
| 1 | Light Source |
| 2 | Reflective Mirror |
| 3 | Microlens Array |
| 4 | Microlens |
| 5, 18, 21, 31 | Light Axis |
| 6 | Liquid Crystal Panel |
| 7, 17 | First Filter |
| 8a, 24a | First Picture Element Driven According To First Color Signal |
| 8b, 24b | Second Picture Element Driven According To Second Color Signal |
| 8c, 24c | Third Picture Element Driven According To Third Color Signal |
| 9 | Projection Lens |
| 10 | Screen |
| 11, 15, 25 | Reflective Layer |
| 12, 20 | Second Filter |
| 13 | Parallel Plane Plate |
| 14 | Third Filter |
| 16 | Filter Array |
| 19 | First Reflective Layer |
| 22 | Second Reflective Layer |
| 23 | Reflection Type Liquid Crystal Panel |
| 26 | First Dichroic Mirror (Third Mirror) |
| 27 | Second Dichroic Mirror (Fourth Mirror) |
| 28a | First Light Source |
| 28b | Second Light Source |
| 29a | First Reflective Mirror |
| 29b | Second Reflective Mirror |
| 30 | Third Filter |
| 33 | Fourth Filter |
| 40 | Polarized Beam Splitter |
| 41 | Plane Mirror |
| 42 | Phase Difference Plate |
| 100 | Light Source |
| 101 | Reflective Mirror |
| 102a | First Incident Light Polarizer |
| 102b | Second Incident Light Polarizer |
| 102c | Third Incident Light Polarizer |
| 103 | Liquid Crystal Panel |
| 104a | First Radiant Light Polarizer |
| 104b | Second Radiant Light Polarizer |
| 105 | Projection Lens |
| 106 | Color Filter |
| 107 | First Dichroic Mirror |
| 108 | First Plane Mirror |
| 110 | Second Dichroic Mirror |
| 111 | Third Dichroic Mirror |
| 112 | Fourth Dichroic Mirror |
| 113 | Second Plane Mirror |

DETAILED DESCRIPTION OF THE INVENTION

A few exemplary embodiments of the image display apparatus of the present invention will be explained in the following:

EXAMPLE 1

Figure 1:
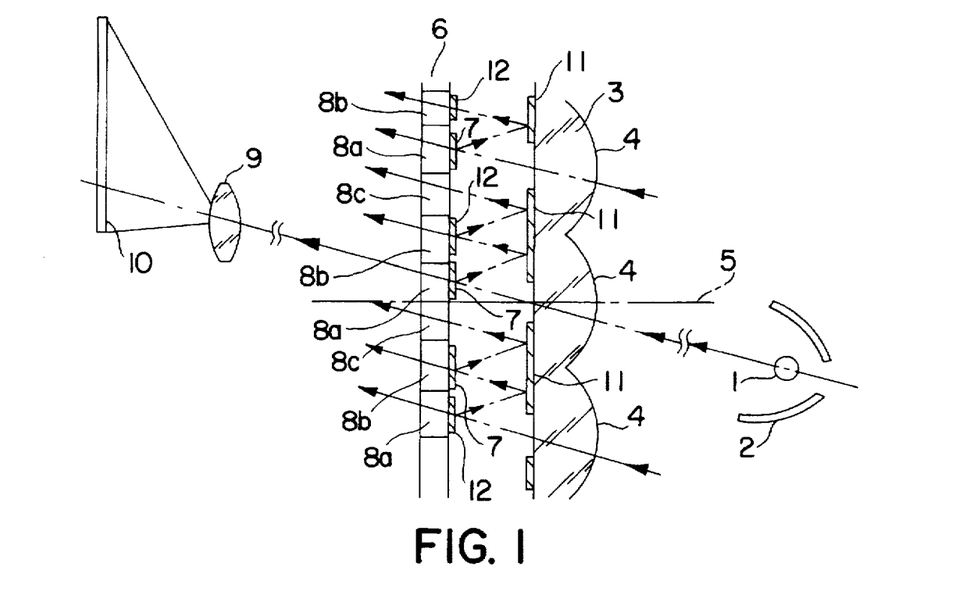
FIG. 1 is a schematic illustration of an image display apparatus as a first exemplary embodiment of the present invention.

FIG. 1 is a schematic illustration of an image display apparatus as an exemplary embodiment of the present invention. In FIG. 1, an illumination means consists of a light source 1, a reflective mirror 2 and a control device (not shown in FIG. 1). The reflective mirror 2 is placed behind the light source 1. The light radiated from the light source 1 is controlled to proceed in a specified direction by the reflective mirror 2 and the control device. The light from the light source 1 comprises light of a first wavelength, light of a second wavelength and light of a third wavelength. The first wavelength light, second wavelength light and third wavelength light correspond to blue light, green light and red light, respectively.

In front of the light source 1 is a microlens array 3 comprising a plurality of microlenses 4. The microlens array 3 is arranged so that the light from the illumination means is incident on the microlens 4 obliquely to the light axis 5 of the microlens 4. The light radiant side surface of the microlens 4 is convex, and the other side surface is flat. Conversely, the light incident side surface of the microlens 4 can be made convex. The light axis 5 of each respective microlens 4 is parallel to one another.

In front of the microlens array 3 is located a liquid crystal panel 6 serving as a transmission type image display means. The liquid crystal panel 6 is formed of picture elements, each of which comprises a first picture element 8a, second picture element 8b and third picture element 8c, a glass plate on which the picture elements are disposed, and an electric control means. The first picture element 8a, second picture element 8b and third picture element 8c are the same size, and each respective picture element is positioned with a regular spacing corresponding to three times the spacing between two immediately neighboring picture elements. Also, the size of each respective microlens 4 is about three times the area occupied by the first picture element 8a, second picture element 8b or third picture element 8c. The picture element is arranged in parallel to the microlens array 3.

The first picture element 8a is driven by the electric control means according to a first color signal corresponding to the first wavelength light. The second picture element 8b is driven by the electric control means according to a second color signal corresponding to the second wavelength light. The third picture element 8c is driven by the electric control means according to a third color signal corresponding to the third wavelength light. A first filter 7 is disposed on the light incident side surface of the glass plate of the first picture element 8a. A second filter 12 is disposed on the light incident side surface of the glass plate of the second picture element 8b.

The first filter 7 has a first dichroic coating, which is characterized by passing the first wavelength light only and reflecting the second wavelength light and third wavelength light, and a width almost equal to that of the picture element 8a. The second filter 12 has a second dichroic coating, which is characterized by passing the second wavelength light and reflecting light of other wavelengths, and a width almost equal to that of the picture element 8b.

On the back side surface of the microlens array 3 is a reflective layer 11 with an opening, which serves as a light reflecting means. The reflective layer 11 is characterized by reflecting the first wavelength light and third wavelength light. The opening of the reflective layer 11 is positioned so as to direct the light gathered by the microlens 4 to the first filter 7.

A projection lens 9 is located on the light radiant side of the liquid crystal panel 6 to serve as a light projection means. A screen 10 is installed on the light radiant side of the projection lens 9.

In the foregoing structures, the light from the light source 1 is controlled to proceed in one direction by the reflective mirror 2. This controlled light is incident on the microlens 4 obliquely to the light axis 5 of the microlens 4 and then focused on the first filter 7.

The first wavelength light having passed through the first filter 7 passes through the picture element 8a, and is projected on the screen 10 by the projection lens 9. On the other hand, the second wavelength light and third wavelength light reflected by the first filter 7 are reflected by the reflective layer 11 and then incident on the second filter 12. The second wavelength light having passed through the second filter 12 passes through the picture element 8b, and then is projected on the screen 10 by the projection lens 9.

The third wavelength light reflected by the second filter 12 is reflected by the reflective layer 11 and incident on the picture element 8c. The third wavelength light having passed through the picture element 8c is projected on the screen 10 by the projection lens 9.

Thus, a composite color image is displayed on the screen 10.

The illumination means, microlens 4, liquid crystal panel 6 with picture elements, first filter 12, reflective layer 11, projection lens 9 and screen 10 are positionally arranged so as to realize the light paths as described above.

More specifically, the first wavelength light radiated from the illumination means passes through the first filter 7 and first picture element 8a, and is incident on the projection lens 9. The second wavelength light from the illumination means is reflected by the first filter 7 and reflective layer 11, passes through the second filter 12 and second picture element 8b, and is incident on the projection lens 9. The third wavelength light from the illumination means is reflected by the first filter 7, reflective layer 11, second filter 12 and reflective layer 11 in succession, passes through the third picture element 8c, and is incident on the projection lens 9.

The first wavelength light, second wavelength light and third wavelength light radiated from the projection lens 9 are projected on the screen 10. A color image formed by combining the first wavelength light, second wavelength light and third wavelength light is displayed on the screen 10.

Accordingly, the color resolving optical system is of a single plate system with the structure of the present example, thereby featuring an extremely compact construction. Therefore, while maintaining the featured compactness of the image display apparatus of a single plate system, it has become possible to realize high luminance of almost three times the luminance of the prior art image display apparatus of a single plate system. In other words, a compact and high luminance projection type image display apparatus has become available.

In the foregoing example, it is also possible to use a filter in place of the reflective layer 1, thereby allowing the color purity of the projected images to be adjusted. Also, the microlens 4 can be used as a distributed refractive index type lens. Although the first filter 7 and second filter 12 are located on the light incident side of the liquid crystal panel 6 and the reflective layer 11 is disposed on the back side surface of the microlens array 3 in the present example, it is also possible for the first filter 7 and second filter 12 to be located on the light radiant side of the liquid crystal panel 6 and for the plane plate disposed with the reflective layer 11 to be placed between the liquid crystal panel 6 and the microlens array 3.

Figure 2:
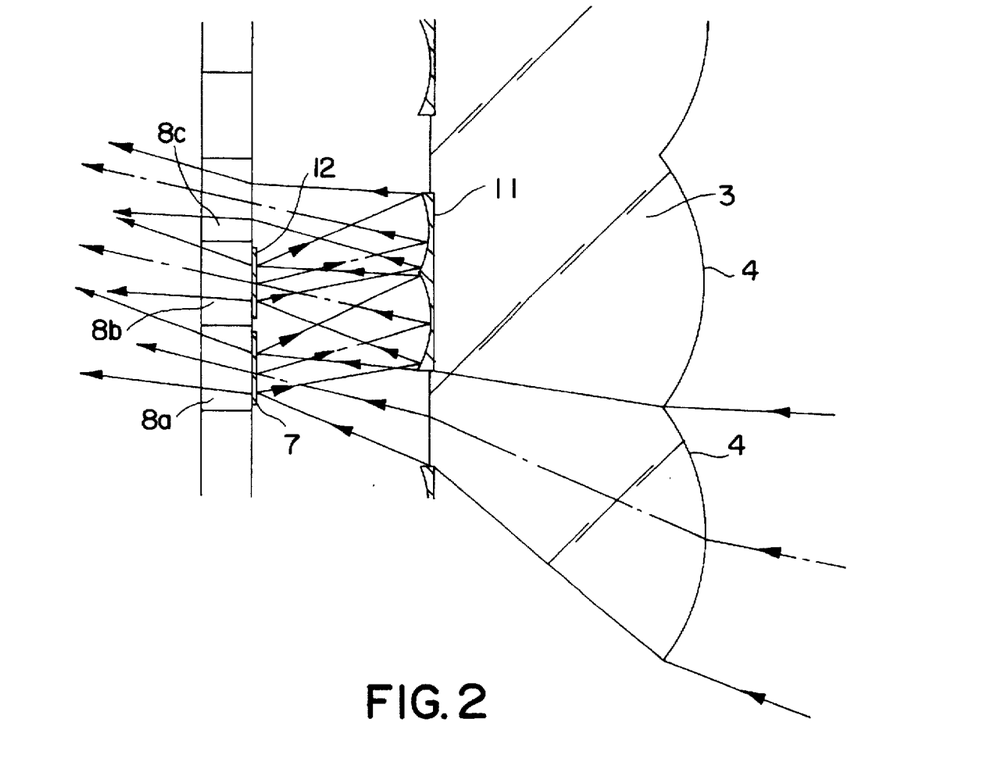
FIG. 2 is a schematic illustration of a first modified version of the image display apparatus of FIG. 1.

FIG. 2 is a schematic illustration of a modified version of the projection type image display apparatus as illustrated in FIG. 1. In FIG. 2, the surface of the reflective layer 11 is made concave for an enhanced light-gathering effect. The light-gathering effect of the first filter 7 and second filter 12 is improved by use of the concave reflective layer 11. Furthermore, the freedom in choosing such structural parameters as the incident angle of the light from the light source, the distance between the liquid crystal panel 6 and the reflective layer 11, and the like can be increased. The rest of the components used in the system of FIG. 2 above are the same as described with reference to FIG. 1.

Figure 3:
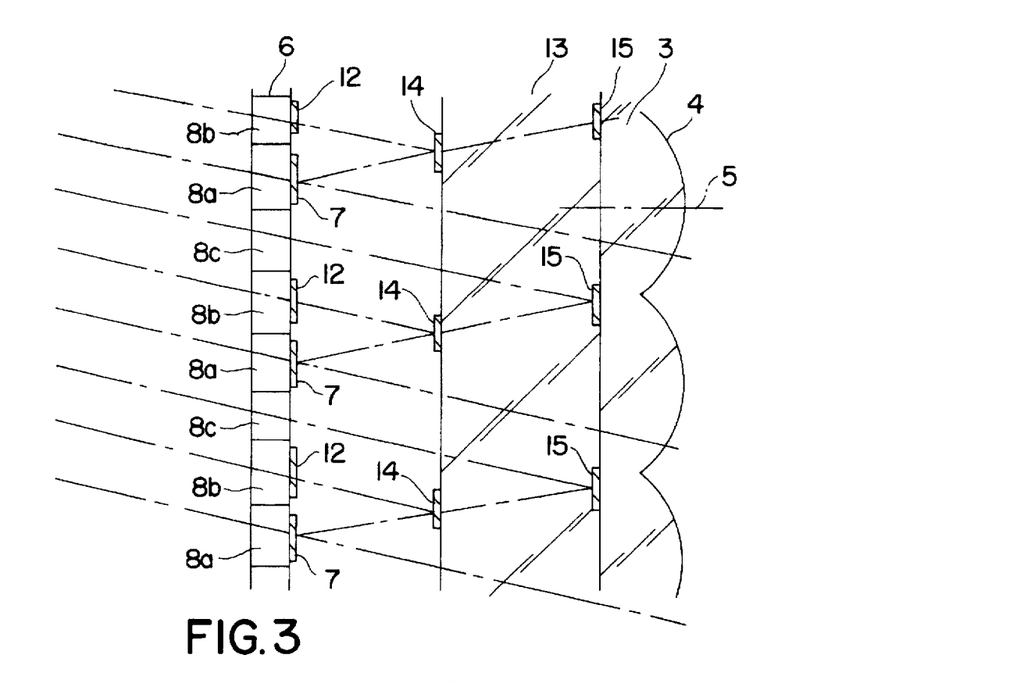
FIG. 3 is a schematic illustration of a second modified version of the image display apparatus of FIG. 1.

FIG. 3 is a schematic illustration of another modified version of the projection type image display apparatus as illustrated in FIG. 1. In FIG. 3, a plane plate 13 is placed in contact with the back surface of the microlens array 3. A reflective layer 15 is disposed on the back side surface of the microlens array 3, and a third filter 14 is disposed on the back side surface of the plane plate 13. The third filter 14 has a third dichroic coating which is characterized by reflecting the second wavelength light and passing the third wavelength light. The rest of the components used in the system of FIG. 3 are the same as described with reference to FIG. 1.

Accordingly, the light radiated from the illumination means is incident on the microlens array 4 obliquely to the light axis 5 of the microlens array 4 and focused. Then the focused light is incident on the first filter 7 disposed on the light incident side surface of the glass plate of the liquid crystal panel 6. The second wavelength light and third wavelength light reflected by the first filter 7 are incident on the third filter 14. Thus, the second wavelength light is directed to the picture element 8b which is driven according to the second color signal. On the other hand, the third wavelength light is reflected by the reflective layer 15 after passing through the third filter 14. The reflected third wavelength light is directed to the picture element 8c which is driven according to the third color signal.

More specifically, the first wavelength light radiated from the illumination means passes through the first filter 7 and first picture element 8a, and is incident on the projection lens 9. The second wavelength light from the illumination means is reflected by the first filter 7 and third filter 14, passes through the second filter 12 and second picture element 8b, and is incident on the projection lens 9.

The third wavelength light from the illumination means is reflected by the first filter 7, passes through the third filter 14, is reflected by the reflective layer 15, passes through the third picture element 8c and is incident on the projection lens 9.

The same effect as observed with the structure shown in FIG. 1 can be gained with the structures shown in FIG. 2 and FIG. 3.

EXAMPLE 2

Figure 4:
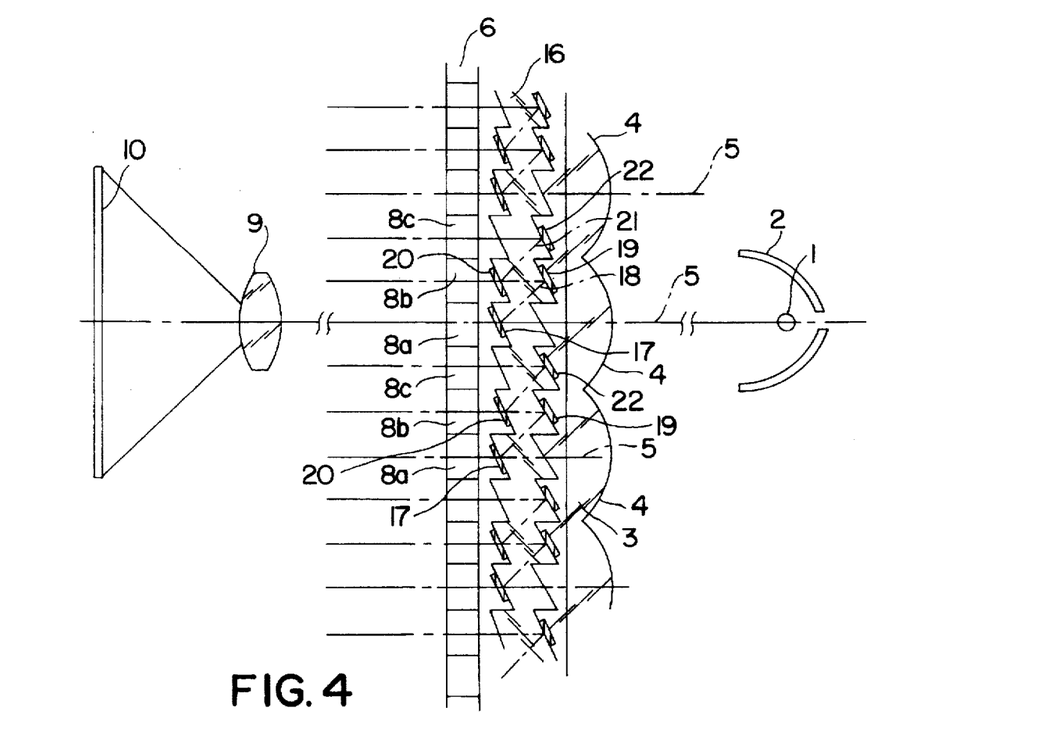
FIG. 4 is a schematic illustration of an image display apparatus as a second exemplary embodiment of the present invention.

FIG. 4 is a schematic illustration of an important part of an image display apparatus as another exemplary embodiment of the present invention. In FIG. 4, a reflective mirror 2 is placed behind a light source 1. The light radiated from the light source 1 is controlled to proceed in a specified direction by the reflective mirror 2 and a control device (not shown in FIG. 4). An illumination means is comprised of the light source 1, reflective mirror 2 and control device. The light from the light source 1 is composed of light of a first wavelength, light of a second wavelength and light of a third wavelength. The first wavelength light, second wavelength light and third wavelength light correspond to blue light, green light and red light, respectively.

In front of the light source 1 is a microlens array 3 comprising a plurality of microlenses 4. The microlens array 3 is arranged so that the light from the illumination means proceeds in parallel to the light axis 5 of the microlens 4. The surface of the microlens 4 on the side of the light source 1 is convex, and the other side surface is flat. The light axis 5 of each respective microlens 4 is parallel to one another.

A filter array 16 is located on the light radiant side of the microlens array 3. Each of the two surfaces of the filter array 16 has a plurality of small plane surfaces formed by cutting obliquely into the filter array 16 so that the cross-section of the filter array 16 looks like two saw blades, and all of the above small plane surfaces are in parallel with one another. A first filter 17 and a second filter 20 are disposed alternately on the foregoing small plane surfaces obliquely cut on the light radiant side surface of the filter array 16. Also, a first reflective layer 19 and a second reflective layer 22 serving as a light reflecting means are disposed alternately on the foregoing small plane surfaces obliquely cut on the light incident side surface of the filter array 16. Accordingly, the first filter 17 and second filter 20 are placed obliquely to the light axis 5 of the filter array 16. Likewise, the first reflective layer 19 and second reflective layer 22 are placed obliquely to the light axis 5 of the filter array 16. In other words, the first reflective layer 19 and second reflective layer 22 are disposed in parallel to the first filter 17 and second filter 20, respectively.

In front of the filter array 16 a liquid crystal panel 6 serving as a transmission type image display means is arranged vertically to the light axis 5 of the filter array 16. The liquid crystal panel 6 is comprised of picture elements, each of which comprises a first picture element 8a, second picture element 8b and third picture element 8c, a glass plate on which the picture elements are disposed, and an electric control means.

The first picture element 8a, second picture element 8b and third picture element 8c are the same size, and each respective picture element is positioned with a regular spacing corresponding to three times the spacing between two immediately neighboring picture elements. Also, the sizes of each respective microlens 4 are about three times the area occupied by the first picture element 8a.

The first picture element 8a is driven according to a first color signal that corresponds to the first wavelength light, and the second picture element 8b is driven according to a second color signal that corresponds to the second wavelength light.

The width of the first filter 17 is the same as that of the projected dimension of the first picture element 8a, and the first filter 17 is provided with a dichroic coating, which is characterized by passing the first wavelength light only and reflecting light of other wavelengths. The width of the second filter 20 is the same as that of the projected dimension of the second picture element 8b, and the second filter 20 is provided with a dichroic coating, which is characterized by passing the second wavelength light only and reflecting light of other wavelengths.

In front of the liquid crystal panel 6 is arranged a projection lens 9 serving as a light projection means. A screen 10 is installed in front of the projection lens 9.

In the foregoing structures, the light from the light source 1 is controlled to proceed in one direction by the reflective mirror 2. This controlled light is incident on the microlens 4 along the light axis 5 of the microlens 4 and then focused. Then, the focused light passes through the light incident side surface of the filter array 16 and is incident on the first filter 17.

The first picture element 8a is disposed on a plane surface, which includes the light axis 5 and the light axis is of the light reflected by the first filter 17, with a regular spacing corresponding to three times the spacing between two immediately neighboring picture elements.

The first wavelength light having passed through the first filter 17 is incident on the first picture element 8a. The light having passed through the first picture element 8a is projected on the screen 10 by the projection lens 9.

On the other hand, the second wavelength light and third wavelength light reflected by the first filter 17 are reflected along the light axis 18 by the first reflective layer 19 and then incident on the second filter 20. The second wavelength light that passed through the second filter 20 is incident on the second picture element 8b. The second wavelength light having passed through the second picture element 8b is projected on the screen 10 by the projection lens 9.

The first filter 17, first reflective layer 19, second filter 20 and second picture element 8b are arranged so that the light paths as described in the foregoing are realized.

Also, the third wavelength light reflected by the second filter 20 proceeds along the light axis 21 and is incident on the reflective layer 22 and reflected there. This reflected third wavelength light is incident on the third picture element 8c that is driven according to the third color signal. The third wavelength light having passed through the foregoing third picture element 8c is projected on the screen 10 by the projection lens 9.

In other words, the first wavelength light from the illumination means passes through the first filter 17 and then first picture element 8a, and is incident on the projection lens 9. The second wavelength light from the illumination means is reflected by the first filter 17 and first reflective layer 19, passes through the second filter 20 and second picture element 8b, and is incident on the projection lens 9. The third wavelength light from the illumination means is reflected by the first filter 17, first reflective layer 19, second filter 20 and second reflective layer 22 in succession, passes through the third picture element 8c, and is incident on the projection lens 9.

Thus, a composite color image is displayed on the screen 10.

With the structures of the present example, the color resolving optical system is made extremely compact. Therefore, it has become possible to realize high luminance of almost three times the luminance of the prior art image display apparatus of a single plate system while maintaining the compactness featured by the image display apparatus of a single plate system.

With Example 1, the light from the light source is incident on the liquid crystal panel obliquely and images are projected obliquely on the screen. In contrast to this, the light from the light source is incident squarely on the liquid crystal panel with the present example, thus resulting in images projected squarely on the screen.

With the present example, it is also possible to employ the following variations:

Instead of a structure comprising the first filter 17, second filter 20, first reflective layer 19 and second reflective layer 22 disposed on the filter array 16, a structure wherein the first filter 17 and second filter 20 are disposed on the glass surface side of the liquid crystal panel 6 and the first reflective layer 19 and second reflective layer 22 are disposed on the microlens array 3 is also possible.

Furthermore, in the same way as in Example 1, the first reflective layer 19 and second reflective layer 22 are provided with dichroic mirrors for improved picture quality.

EXAMPLE 3

Figure 5:
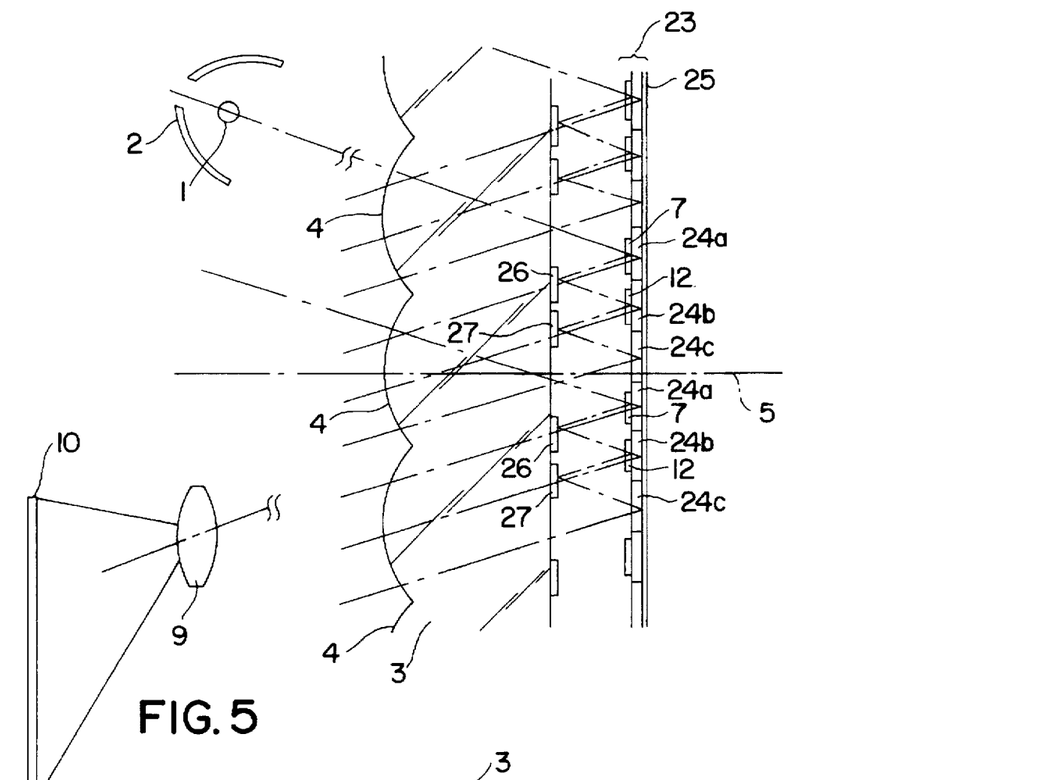
FIG. 5 is a schematic illustration of an image display apparatus as a third exemplary embodiment of the present invention.

FIG. 5 is a schematic illustration of an image display apparatus as still another exemplary embodiment of the present invention. In FIG. 5, a reflective mirror 2 is placed behind a light source 1. The light radiated from the light source 1 is controlled to proceed in a specified direction by the reflective mirror 2 and a control device. An illumination means is comprised of the light source 1, reflective mirror 2 and control device. The light from the light source 1 comprises light of a first wavelength, light of a second wavelength and light of a third wavelength. The first wavelength light, second wavelength light and third wavelength light correspond to blue light, green light and red light, respectively.

In front of the light source I is a microlens array 3 comprising a plurality of microlenses 4. The surface of the microlens 4 on the side of the light source 1 is convex, and the other side surface is flat. The microlens array 3 is arranged so that the light from the illumination means is incident on the microlens 4 obliquely to the light axis 5 of the microlens 4.

On the back surface of the microlens array 3 are disposed a first dichroic mirror 26 serving as a third filter and a second dichroic mirror 27 serving as a fourth filter. The first dichroic mirror 26 is characterized by passing the first wavelength light and reflecting the second wavelength light and third wavelength light. The second dichroic mirror 27 is characterized by passing the second wavelength light and reflecting the third wavelength light.

Behind the microlens array 3 is arranged a reflective type liquid crystal panel 23 serving as a reflective type image display means vertically to the light axis 5. The reflective type liquid crystal panel 23 is comprised of a glass plate, picture elements 24, each of which comprises a first picture element 24a, second picture element 24b and third picture element 24c, reflective layers 25 disposed on the back surface of the picture elements 24 to serve as light reflecting means and an electrical control means. The first picture element 24a, second picture element 24b and third picture element 24c are the same in dimension, and each respective picture element is positioned with a regular spacing corresponding to three times the spacing between two immediately neighboring picture elements. The size of each respective microlens 4 is about three times the area occupied by the first picture element 24a. The first picture element 24a is driven according to a first color signal that corresponds to the first wavelength light, the second picture element 24b is driven according to a second color signal that corresponds to the second wavelength light and the third picture element 24c is driven according to a third color signal that corresponds to the third wavelength light.

A first filter 7 is located on the light incident side of the first picture element 24a in parallel to the glass plate and its width is almost the same as that of the first picture element 24a. The first filter 7 passes only the first wavelength light and comprises a first dichroic coating that has the property of reflecting light of all other wavelengths. A second filter 12 is arranged in parallel to the light incident side surface of the second picture element 24b and its width is almost the same as that of the second picture element 24b. The second filter 12 passes only the second wavelength light and comprises a second dichroic coating that has the property of reflecting light of all other wavelengths.

The first dichroic mirror 26 and second dichroic mirror 27 are located at other positions than the one whereby the light gathered by the microlens 4 is directed to the first filter 7. On the side of the microlens 4 of the microlens array 3 are located a projection lens 9 serving as a light projection means and a screen 10.

In the foregoing structures, the light from the light source 1 is controlled to proceed in one direction by the reflective mirror 2. This light is incident on the microlens 4 obliquely to the light axis 5 of the microlens 4 and then focused. Then, the focused light is incident on the first filter 7. The first wavelength light that passed through the first filter 7 is incident obliquely on and passes through the first picture element 24a, and then is reflected by the reflective layer 25. This reflected first wavelength light passes again the reflective type liquid crystal panel 23 and is incident on the first dichroic mirror 26.

The first wavelength light passes through the dichromic mirror 26, and passes further the microlens array 3. The first wavelength light having passed through the microlens array 3 is projected on the screen 10 by the projection lens 9.

The second wavelength light and third wavelength light reflected by the first dichromic mirror 26 are incident on the second filter 12. The second wavelength light having passed through the second filter 12 is incident on and passes through the picture element 24b, and is reflected by the reflective layer 25 disposed on the back of the picture element 24b. The reflected second wavelength light passes again the reflection type liquid crystal panel 23. The second wavelength light having passed through the reflection type liquid crystal panel 23 is incident on the second dichroic mirror 27 disposed on the back of the microlens array 3 together with the third wavelength light reflected by the second filter 12. Since the second dichroic mirror 27 has the property of passing the second wavelength light and reflecting the third wavelength light, the second wavelength light modulated and reflected by the reflection type liquid crystal panel 23 passes through the second dichroic mirror 27 and further the microlens array 3, and then is projected on the screen 10 by the projection lens 9.

The third wavelength light reflected by the second dichroic mirror 27 is incident on the third picture element 24c. The third wavelength light having passed through the third picture element 24c is reflected by the reflective layer 25. This reflected third wavelength passes again through the reflection type liquid crystal panel 23, further passes through the microlens array 3 and is projected on the screen 10 by the projection lens 9.

In other words, the first wavelength light radiated from the illumination means passes through the first filter 7 and then first picture element 24a, is reflected by the reflective layer 25, passes through the first dichromic mirror 26 and is incident on the projection lens 9. The second wavelength light from the illumination means is reflected by the first filter 7 and then first dichroic mirror 26, passes through the second filter 12 and second picture element 24b, is reflected by the reflective layer 25, passes through the second dichroic mirror 27, and finally is incident on the projection lens 9. The third wavelength light from the illumination means is reflected by the first filter 7, first dichroic mirror 26, second filter 12 and second dichroic mirror 27 in succession, passes through the third picture element 24, is reflected by the reflective layer 24 and finally incident on the projection lens 9.

As a result, a composite color image is displayed on the screen 10.

The illumination means, microlens 4, first filter 7, second filter 12, reflection type liquid crystal panel 23 with the picture elements 24, reflective layer 25, projection lens 9 and screen 10 are arranged so as that the light paths as described in the above are realized. Thus, even with the structures of the present example wherein a reflection type liquid crystal panel is used as the reflection type image display means, it has become possible in the same way as Example 1 and Example 2 to realize high luminance of almost three times the luminance of the prior art image display apparatus of a single plate system while maintaining the compactness featured by the image display apparatus of a single plate system because the color resolving optical system employed is made extremely compact.

EXAMPLE 4

Figure 6:
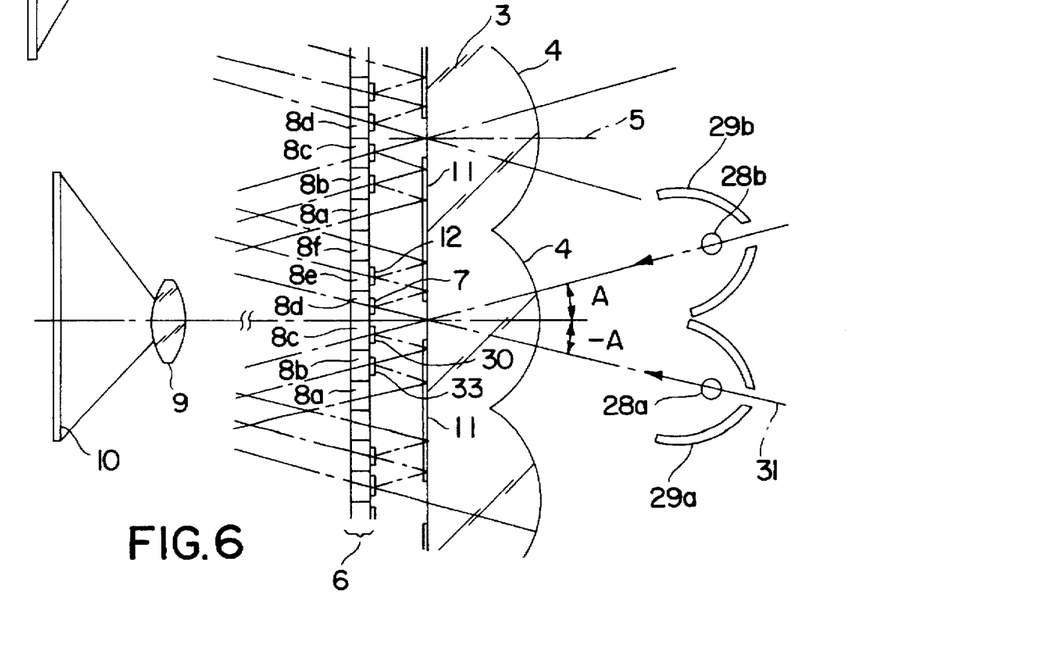
FIG. 6 is a schematic illustration of an image display apparatus as a fourth exemplary embodiment of the present invention.

FIG. 6 is a schematic illustration of an image display apparatus as still another exemplary embodiment of the present invention. In FIG. 6, a first light source 28a and second light source 28b are located at specified positions. Behind the first light source 28a and second light source 28b are placed a first reflective mirror 29a and a second reflective mirror 29b, respectively. An illumination means is formed of a first illumination means comprising the first light source 28a and first reflective mirror 29a, and a second illumination means comprising the second light source 28b and second reflective mirror 29b. Each respective light from the first light source 28a and second light source 28b comprises light of a first wavelength, light of a second wavelength and light of a third wavelength. The foregoing first wavelength light, second wavelength light and third wavelength light correspond to blue light, green light and red light, respectively.

In front of the illumination means is arranged a microlens array 3 comprising a plurality of microlenses 4. On the back surface of the microlens array 3 is disposed a reflective layer 11 serving as a light reflecting means. In front of the microlens array 3 is arranged a liquid crystal panel 6 serving as a transmission type image display means vertically to the light axis of the microlens array 4. The liquid crystal panel 6 is formed of picture elements, each of which comprises a first picture element 8a, second picture element 8b, third picture element 8c, fourth picture element 8d, fifth picture element 8e and sixth picture element 8f.

The first picture element 8a, second picture element 8b, third picture element 8c, fourth picture element 8d, fifth picture element 8e and sixth picture element 8f are the same size, and each respective picture element is positioned with a regular spacing corresponding to six times the spacing between two immediately neighboring picture elements. The sizes of each respective microlens 4 are about six times the area occupied by each picture element. The first picture element 8a and fourth picture element 8d are driven according to a first color signal that corresponds to the first wavelength light. The second picture element 8b and fifth picture element 8e are driven according to a second color signal that corresponds to the second wavelength light. The third picture element 8c and sixth picture element 8f are driven according to a third color signal that corresponds to the third wavelength light. The first picture element 8a, second picture element 8b, third picture element 8c, fourth picture element 8d, fifth picture element 8e and sixth picture element 8f are arranged in this order next to one another. The positions of the second picture element 8b and fifth picture element 8e are symmetric with respect to the light axis 5.

A first filter 7 is located on the light incident side of the fourth picture element 8d in parallel thereto, and has almost the same width as the fourth picture element 8d.

The first filter 7 comprises a first dichroic coating characterized by passing only the first wavelength light and reflecting all other wavelengths. A second filter 12 is located on the light incident side of the fifth picture element 8e in parallel thereto, and has almost the same width as the fifth picture element 8e. The second filter 12 comprises a second dichroic coating characterized by passing only the second wavelength light and reflecting the light of all other wavelengths. A third filter 30 is placed at the light incident side of the third picture element 8c in parallel thereto, and has almost the same width as the third picture element 8c. The third filter 30 comprises a third dichroic coating characterized by passing only the third wavelength light and reflecting light of all other wavelengths. A fourth filter 33 comprises the second dichroic coating characterized by passing only the second wavelength light and reflecting light of all other wavelengths. The fourth filter 33 has the same function as the second filter 12 although it is referred to differently from the second filter 12.

In front of the liquid crystal panel 6 are placed a projection lens 9 serving as a light projection means and a screen 10.

In FIG. 6, the light radiated from the first light source 28a is controlled by the first reflective mirror 29a to proceed in one direction along the light axis 31. This light proceeding along the light axis 31 is incident on the microlens array 3 obliquely at an incident angle of (−A) from the light axis 5 of the microlens array 4, and then focused. The focused light is incident on the first filter 7. The first wavelength light having passed through the first filter 7 is incident on and passes through the fourth picture element 8d, and then is projected on the screen 10 by the projection lens 9.

The second wavelength light and third wavelength light reflected by the first filter 7 are reflected by the reflective layer 11 and is incident on the sixth picture element 8f. The light having passed through the sixth picture element 8f is projected on the screen 10 by the projection lens 9.

The illumination means, microlens 4, first filter 7, second filter 12, third filter 30, fourth filter 33, liquid crystal panel 6 with the picture elements, reflective layer 11, projection lens 9 and screen 10 are arranged so that the light paths as described in the above are realized.

On the other hand, the light from the second light source 28b is controlled to proceed in other direction by the second reflective mirror 29b. This controlled light is incident obliquely on the microlens 4 at an incident angle (+A) from the light axis of the microlens 4, and then focused. The focused light is incident on the third filter 30.

The third wavelength light and second wavelength light having been reflected by the third filter 30 are reflected by the reflective layer 11 and then incident on the fourth filter 33.

The reflective layer 11 is provided with openings so that only the portions of the light gathered by the microlens 4 that correspond to the light gathered to the first filter 7 and third filter 30 are reflected without blocking any other portions of light.

The second wavelength light having passed through the fourth filter 33 is incident on the screen 10. The first wavelength light having been reflected by the fourth filter 33 is reflected by the reflective layer 11, and then is incident on the first picture element 8a. The light having passed through the first picture element 8a is projected on the screen by the projection lens 9.

In other words, the first wavelength light from the first illumination means passes through the first filter 7 and fourth picture element 8d, and is incident on the projection lens 9. The second wavelength light from the first illumination means is reflected by the first filter 7 and reflective layer 11, passes through the second filter 12 and fifth picture element 8e, and is incident on the projection lens 9. The third wavelength light from the first illumination means is reflected by the first filter 7, reflective layer 11, second filter 12 and reflective layer 11, passes through the sixth picture element 8f, and then is incident on the projection lens 9. The second wavelength light from the second illumination means is reflected by the third filter 30 and reflective layer 11, passes through the fourth filter 33 and second picture element 8b, and is incident on the projection lens 9. The third wavelength light from the second illumination means passes through the third filter 30 and third picture element 8c, and is incident on the projection lens 9.

The first wavelength light, second wavelength light and third wavelength light from the projection lens 9 are projected on the screen 10.

Thus, a composite color image is displayed on the screen 10.

As a result, it has become possible to realize high luminance of almost three times the luminance of the prior art image display apparatus of a single plate system while maintaining the compactness featured by the image display apparatus of a single plate system. Further, the brightness of the image display apparatus can be increased as much as twice.

Figure 7:
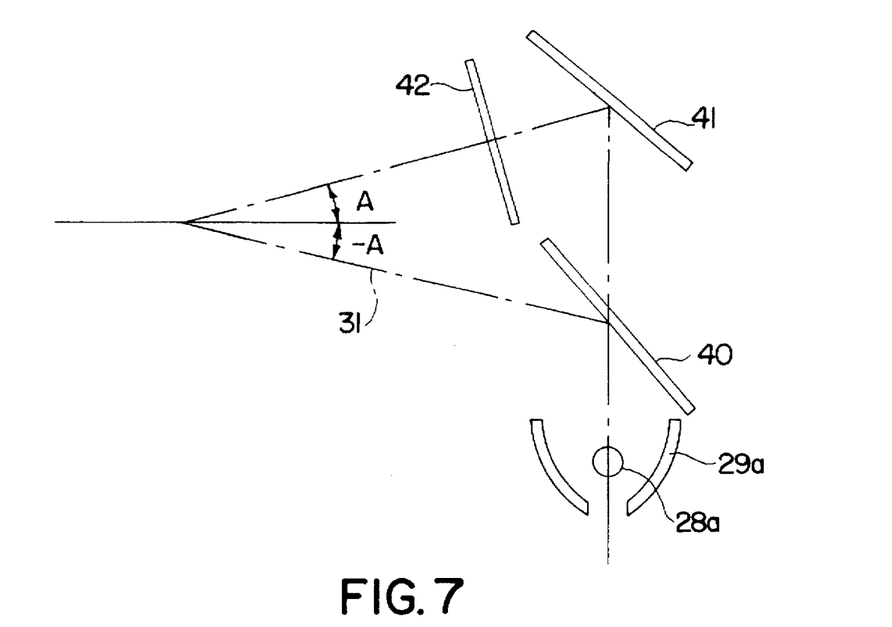
FIG. 7 is a schematic illustration of a modified version of the image display apparatus of FIG. 6.

FIG. 7 is a schematic illustration of a modified version of the projection type image display apparatus of a single plate system as shown in FIG. 6. More specifically, FIG. 7 shows a polarization converting means that is placed between the first light source and the microlens array 3 of the projection type image display apparatus as illustrated in FIG. 6. The polarization converting means to be used together with the first light source 28a and first reflective mirror 29a comprises a polarized beam splitter 40, reflective mirror 41 and phase difference plate 42. The polarized beam splitter 40 has the function of reflecting only the light with polarization directions useful to the liquid crystal panel 6 out of the incident light. The phase difference plate 42 has the function of converting the incident light to light with polarization directions that are useful to the liquid crystal panel 6.

In FIG. 7, the light from the light source 28a is controlled by the first reflective mirror 29a to proceed in one direction and then incident on the polarized beam splitter 40. Out of the incident light, only the light with polarization directions useful to the liquid crystal panel 6 to the polarization directions of the light that passed through the polarized beam splitter 40 is reflected by the reflective mirror 41. The light reflected by the reflective mirror 41 passes through the phase difference plate 42 and is incident on the microlens array 4 at an angle of (+A) to the light axis 5.

When compared with the prior art image display apparatus, wherein the light of one polarization direction only is utilized from the light from the light source, the light utilization factor of the foregoing image display apparatus has been improved almost as much as twice by employing the polarization converting means as described above.

With the foregoing Example 1 to Example 4, any light incident side polarizers and light radiant side polarizers are not used, but if necessary these can be incorporated, thereby enhancing the light utilization factor. At the same time, the light absorption that takes place within an image display apparatuses is greatly reduced. Therefore, the light source output of the image display apparatus can be increased, resulting in much higher luminance for the color image display apparatus.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A projection type image display apparatus comprising:
   (a) an illuminating means to radiate a first wavelength light, a second wavelength light and a third wavelength light;
   (b) a microlens array provided with a plurality of microlenses located on a light radiant side of said illumination means;
   (c) a transmission type image displaying means located on a light radiant side of said microlens array and provided with a plurality of picture elements, each of which is controllable individually by an external signal,
   said plurality of picture elements comprising a first picture element driven by a first color signal corresponding to said first wavelength light, a second picture element driven by a second color signal corresponding to said second wavelength light and a third picture element driven by a third color signal corresponding to said third wavelength light;
   (d) a first filter arranged on a light incident side of and in parallel to said first picture element, having approximately the same width as that of said first picture element, for passing the first wavelength light only and reflecting light of other wavelengths;
   (e) a second filter arranged on a light incident side of and in parallel to said second picture element, having approximately the same width as that of said second picture element, for reflecting the third wavelength light;
   (f) a light reflecting means placed between said first filter and said second filter and said microlens array and characterized by reflecting the second wavelength light and third wavelength light at areas other than the area where the light from said microlens passes through; and
   (g) a light projecting means located on a light radiant side of said transmission type image displaying means,
   wherein said first wavelength light from said illumination means passing through said microlens, first filter and first picture element, and being incident on said light projecting means;
   said second wavelength light from said illuminating means passing through said microlens, being reflected by said first filter and light reflecting means, passing through said second filter and second picture element, and being incident on said light projecting means; and
   said third wavelength light from said illuminating means passing through said microlens, being reflected by said first filter, light reflecting means, second filter and light reflecting means, passing through said third picture element, and being incident on said light projecting means.

2. A projection type image display apparatus according to claim 1, wherein the light radiated from said illuminating means is incident on said microlens obliquely to the light axis.

3. A projection type image display apparatus according to claim 1, wherein said first filter comprises a first dichroic for passing said first wavelength light and reflecting light of other wavelengths, and said second filter comprises a second dichroic coating for passing said second wavelength light and reflecting light of other wavelengths.

4. A projection type image display apparatus according to claim 1, wherein said first, second and third picture elements have the same dimensions, and the length of each respective microlens of said plurality of microlenses is the same as the total length of said first, second and third picture elements.

5. A projection type image display apparatus according to claim 1 wherein the shape of said light reflecting means is concave.

6. A projection type image display apparatus according to claim 1, wherein said light reflecting means is disposed on the light radiant side surface of said microlens array.

7. A projection type image display apparatus comprising:
(a) an illuminating means to radiate a first wavelength light, a second wavelength light and third wavelength light;
(b) a microlens array provided with a plurality of microlenses located on a light radiant side of said illumination means;
(c) a transmission type image displaying means located on a light radiant side of said microlens array and provided with a plurality of picture elements, each of which is controllable individually by an external signal, said plurality of picture elements comprising a first picture element driven by a first color signal corresponding to said first wavelength light, a second picture element driven by a second color signal corresponding to said second wavelength light and a third picture element driven by a third color signal corresponding to said third wavelength light;
(d) a first filter located on a light incident side of said first picture element obliquely, having a width corresponding to the projected dimension of said second picture element, for passing the first wavelength light only and reflecting light of other wavelengths;
(e) a second filter located on a light incident side of said second picture element obliquely, arranged in parallel to said first filter and provided with a width corresponding to the projected dimension of said second picture element, for reflecting the third wavelength light;
(f) a light reflecting means located on a light incident side of said first filter and said second filter, arranged in parallel to said first filter and said second filter, respectively, and characterized by reflecting the second wavelength light and third wavelength light at areas other than the area where the light from said microlens passes through; and
(g) a light projecting means located on a light radiant side of said transmission type image displaying means,
wherein said first wavelength light from said illuminating means passing through said microlens, first filter and first picture element, and being incident on said light projecting means;
said second wavelength light from said illuminating means passing through said microlens, being reflected by said first filter and light reflecting means, passing through said second filter and second picture element, and being incident on said light projecting means; and said third wavelength light from said illuminating means passing through said microlens, being reflected by said first filter, light reflecting means, second filter and light reflecting means, passing through said third picture element, and being incident on said light projecting means.

8. A projection type image display apparatus according to claim 7, wherein said first filter comprises a first dichroic coating for passing said first wavelength light and reflecting light of other wavelengths, and said second filter comprises a second dichroic coating for passing said second wavelength light and reflecting light of other wavelengths.

9. A projection type image display apparatus according to claim 7, further comprising a filter array placed between said transmission type image displaying means and said microlens array,
wherein one surface of said filter array forms a plurality of first plane surfaces and the other surfaces forms a plurality of a second plane surfaces, said surfaces cutting into the body of said filter array to form a saw blade shaped cross-section,
said plurality of first plane surfaces and second plane surfaces being in parallel with one another,
said first filter and second filter being disposed on said first plane surface of said filter array located on the side of said transmission type image displaying means, and
said light reflecting means being disposed on said second plane surface of said filter array located on a side of said microlens array.

10. A projection type image display apparatus comprising:
(a) an illuminating means to radiate a first wavelength light, a second wavelength light and a third wavelength light;
(b) a microlens array provided with a plurality of microlenses arranged obliquely to a light radiant direction of said illuminating means;
(c) a reflection type image displaying means located on the back side of said microlens array and provided with a plurality of picture elements, each of which is controllable individually by an external signal;
said plurality of picture elements comprising a first picture element driven by a first color signal corresponding to said first wavelength light, a second picture element driven by a second color signal corresponding to said second wavelength light and a third picture element driven by a third color signal corresponding to said third wavelength light;
(d) a light reflecting means located on the back side of said reflection type image displaying means and characterized by reflecting said first wavelength light, second wavelength light and third wavelength light;
(e) a first filter located on a light incident side of and in parallel to said first picture element, having approximately the same width as that of said first picture element, for passing the first wavelength light and reflecting light of other wavelengths;
(f) a third filter placed at a position included in the path of light reflected by said light reflecting means and in the path of light reflected by said first filter, for reflecting said second wavelength light and third wavelength light and passing said first wavelength light;
(g) a second filter located on a light incident side of and in parallel to said second picture element for reflecting said third wavelength light only;
(h) a fourth filter placed at a position included in the path of light reflected by said light reflecting means which is placed in the back side of said second picture element and in the path of light reflected by said second filter, for reflecting said third wavelength light and passing said second wavelength light; and (i) a light projecting means placed in front of said microlens array, wherein said first wavelength light from said illuminating means passing through said microlens, first filter and first picture element, being reflected by said light reflecting means, passing through said third filter and being incident on said light projecting means;

said second wavelength light from said illuminating means passing through said microlens, being reflected by said first filter and third filter, passing through said second filter and second picture element, being reflected by said light reflecting means, passing through said fourth filter and being incident on said light projecting means; and said third wavelength light from said illuminating means passing through said microlens, being reflected by said first filter, third filter, second filter and fourth filter, passing through said third picture element, being reflected by said light reflecting means and incident on said light projecting means.

11. A projection type image display apparatus according to claim 10, wherein said first filter comprises a first dichroic coating for passing said first wavelength light and reflecting light of other wavelengths, and said second filter comprises a second dichroic coating for passing said second wavelength light and reflecting light of other wavelengths.

12. A projection type image display apparatus according to claim 10, wherein said third filter and fourth filter are disposed on the back surface of said microlens array.

13. A projection type image display apparatus comprising:

(a) a transmission type image displaying means provided with a plurality of picture elements, each of which is controllable individually by an external signal, said plurality of picture elements comprising a first picture element and fourth picture element driven by a first color signal corresponding to a first wavelength light, a second picture element and fifth picture element driven by a second color signal corresponding to a second wavelength light and a third picture element and sixth picture element driven by a third color signal corresponding to a third wavelength light;

(b) a first filter arranged in parallel to a light incident side of said fourth picture element for passing said first wavelength light only and reflecting light of other wavelengths;

(c) a second filter arranged in parallel to a light incident side of said fifth picture element for reflecting said third wavelength light;

(d) a third filter arranged in parallel to a light incident side of said third picture element for passing said third wavelength light and reflecting light of other wavelengths;

(e) a fourth filter arranged in parallel to a light incident side of said second picture element for passing said second wavelength light and reflecting light of other wavelengths;

(f) a microlens array located on a light incident side of said first filter and said second filter, and provided with a plurality of microlenses;

(g) a light reflecting means arranged between said first filter and second filter and said microlens array, for reflecting the second wavelength light and third wavelength light at areas other than the area where the light from said microlens array passes through;

(h) an illuminating means located on the microlens side of said microlens array, and comprising a first illuminating means that has a first light path incident on said microlens at an incident angle of (−A) degrees to the light axis thereof and a second illuminating means that has a second light path incident on said microlens at an incident angle of (+A) degrees to the light axis thereof, each of said first illuminating means and second illuminating means having a light source that radiates the first wavelength light, the second wavelength light and the third wavelength light, A being a real number;

(i) a light projecting means located on the light radiant side of said transmission type image displaying means, wherein said first wavelength light from said first illuminating means passing through said microlens, first filter and fourth picture element, and being incident on said light projecting means;

said second wavelength light from said first illuminating means passing through said microlens, being reflected by said first filter and light reflecting means, passing through said second filter and fifth picture element, and being incident on said light projecting means;

said third wavelength light from said first illuminating means passing through said microlens, being reflected by said first filter, light reflecting means, second filter, light reflecting means, passing through said sixth picture element, and being incident on said light projecting means;

said first wavelength light from said second illuminating means passing through said microlens, being reflected by said third filter, light reflecting means, fourth filter, light reflecting means, passing through said first picture element, and being incident on said light projecting means;

said second wavelength light from said second illuminating means passing through said microlens, being reflected by said third filter and light reflecting means, passing through said fourth filter and second picture element, and being incident on said light projecting means; and said third wavelength light from said second illuminating means passing said microlens, third filter and third picture element, and being incident on said light projecting means.

14. A projection type image display apparatus according to claim 13, wherein said first picture element, second picture element, third picture element, fourth picture element, fifth picture element and sixth picture element have the same dimensions, and the length of each respective microlens of said plurality of microlenses is the same as the total lengths of said first picture element, second picture element, third picture element, fourth picture element, fifth picture element and sixth picture element.

15. A projection type image display apparatus according to claim 13, wherein said light reflecting means is disposed on the back surface of said microlens array.

16. A projection type image display apparatus according to claim 13, further comprising a polarized light conversion means provided with a polarized beam splitter, a phase difference plate and a plane mirror, placed between said first illumination means and said microlens array so that the light radiating from said first illuminating means is separated into a third light path and a fourth light path by said polarized beam splitter, said third light path becomes the same light path as said first light path, and said fourth light path is made the same light path as said second light path by said plane mirror and phase difference plate.

17. A projection type image display apparatus comprising:

(a) an illumination means to radiate a first wavelength light, a second wavelength light and a third wavelength light;

(b) a microlens array provided with a plurality of microlenses located on the light radiant side of said illumination means;

(c) a transmission type image displaying means located on the light radiant side of said microlens array and provided with a plurality of picture elements, each of which is controllable individually by an external signal, said plurality of picture elements comprising a first picture element driven by a first color signal corresponding to said first wavelength light, a second picture element driven by a second color signal corresponding to said second wavelength light and a third picture element driven by a third color signal corresponding to said third wavelength light;

(d) a first filter arranged on the light incident side of said first picture element in parallel having approximately the same width as that of said first picture element, for passing the first wavelength light only and reflecting light of other wavelengths;

(e) a second filter arranged on the light incident side of said second picture element in parallel thereto, having approximately the same width as that of said second picture element, for reflecting the third wavelength light;

(g) a third filter arranged to the side of said microlens array away from said first filter for reflecting said second wavelength light and passing said third wavelength light;

(h) a light reflecting means placed at a position between said third filter and said microlens array, which is different from the position where the light radiated from said microlens passes through, for reflecting said third wavelength light; and (i) a light projecting means located on the light radiant side of said transmission type image displaying means, said first wavelength light from said illuminating means passing through said microlens, first filter and first picture element, and being incident on said light projecting means;

said second wavelength light from said illuminating means passing through said microlens, being reflected by said first filter and third filter, passing through said second filter and second picture element, and being incident on said light projecting means; and said third wavelength light from said illuminating means passing through said microlens, being reflected by said first filter, third filter and light reflecting means, passing through said third picture element, and being incident on said light projecting means.

18. A projection type image display apparatus according to claim 17, wherein the light radiating from said illuminating means is incident on said microlens array obliquely to the light axis.

* * * * *

UNITED STATES PATENT AND TRADE MARK OFFICE
CERTIFICATE OF CORRECTION

PATENT NO. : 5,764,310
DATED : June 9, 1998
INVENTOR(S) : Yamagishi

It is certified that error appears in the above-identified patent and that said Letters Patent is hereby corrected as shown below:

Cover page, item [56] OTHER DOCUMENTS, add the following –European Search Report date 9/20/96.--

Column 26, line 1, delete "(g)" and insert –(f)--.

Column 26, line 5, delete "(h)" and insert –(g)--.

Column 26, line 10, delete "(i)" and insert –(h)--.

Column 26, line 12, before "said first" insert –wherein--.

Signed and Sealed this

Thirtieth Day of March, 1999

*Attest:*

Q. TODD DICKINSON

*Attesting Officer*  *Acting Commissioner of Patents and Trademarks*